United States Patent [19]

Vache et al.

[11] 4,185,748
[45] Jan. 29, 1980

[54] CONTAINER FOR PORTABLE STOVE

[75] Inventors: Marcel Vache; Antoine Ferra, both of Sainte Foy Les Lyon, France

[73] Assignee: Application Des Gaz, Paris, France

[21] Appl. No.: 901,868

[22] Filed: May 1, 1978

[30] Foreign Application Priority Data

May 3, 1977 [FR] France .................................. 77 14626

[51] Int. Cl.² .......................... B65D 7/24; F24C 5/20
[52] U.S. Cl. ......................................... 220/8; 206/509;
126/38
[58] Field of Search ................. 220/8, 4 B, 4 E, 23.83;
126/38, 9 R, 9 A, 9 B; D7/110, 107, 76, 9;
206/509

[56] References Cited

U.S. PATENT DOCUMENTS

| 1,437,812 | 12/1922 | MacMillan | 126/38 |
| 2,538,538 | 1/1951 | Stempel et al. | 126/38 |
| 2,557,613 | 6/1951 | Palensky | 220/8 |
| 2,624,487 | 1/1953 | Fry | 206/509 X |
| 2,876,924 | 3/1959 | Chrisman | 220/8 |

FOREIGN PATENT DOCUMENTS 410885 5/1934 United Kingdom .

OTHER PUBLICATIONS

Hardware Age, 1/5/56, p. 23, Safety-Chef.

Primary Examiner—Steven M. Pollard
Attorney, Agent, or Firm—Dowell & Dowell

[57] ABSTRACT

A container for enclosing a portable stove either in a first fully assembled configuration having one height, or in a second partially dismantled configuration having a second lesser height, the container comprising two saucepans serving as covers and telescopable together to accomodate the stove having either said first or second height, the saucepans having two sets of selectable latch elements vertically spaced along their sidewalls to latch the saucepans at one of the selected heights, and the latch elements being supported on sidewalls which are so shaped that the saucepans can be telescoped together with the latch elements sliding freely between them without snagging on adjacent sidewalls.

5 Claims, 7 Drawing Figures

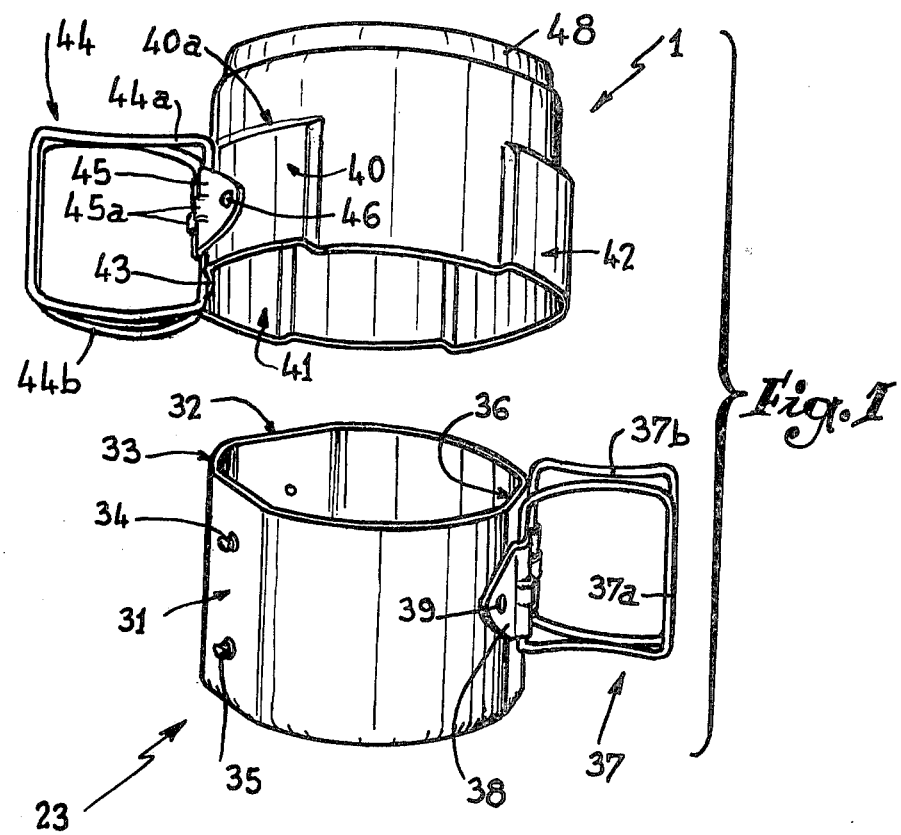
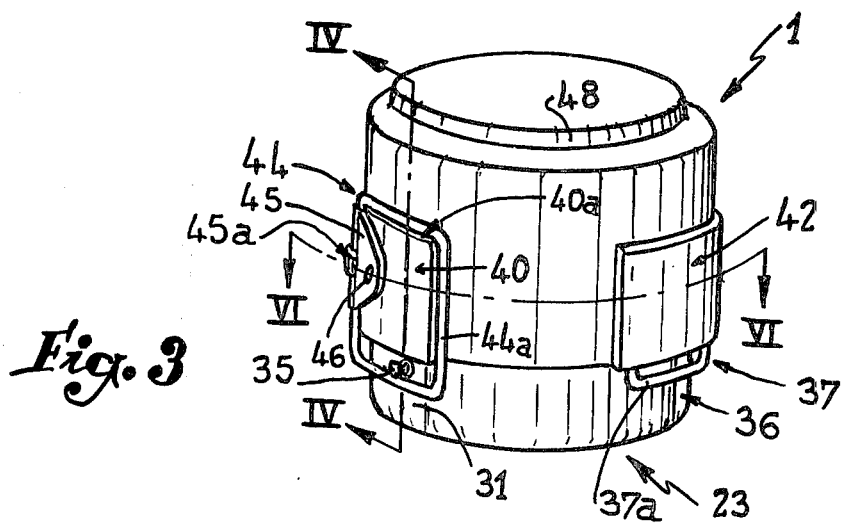

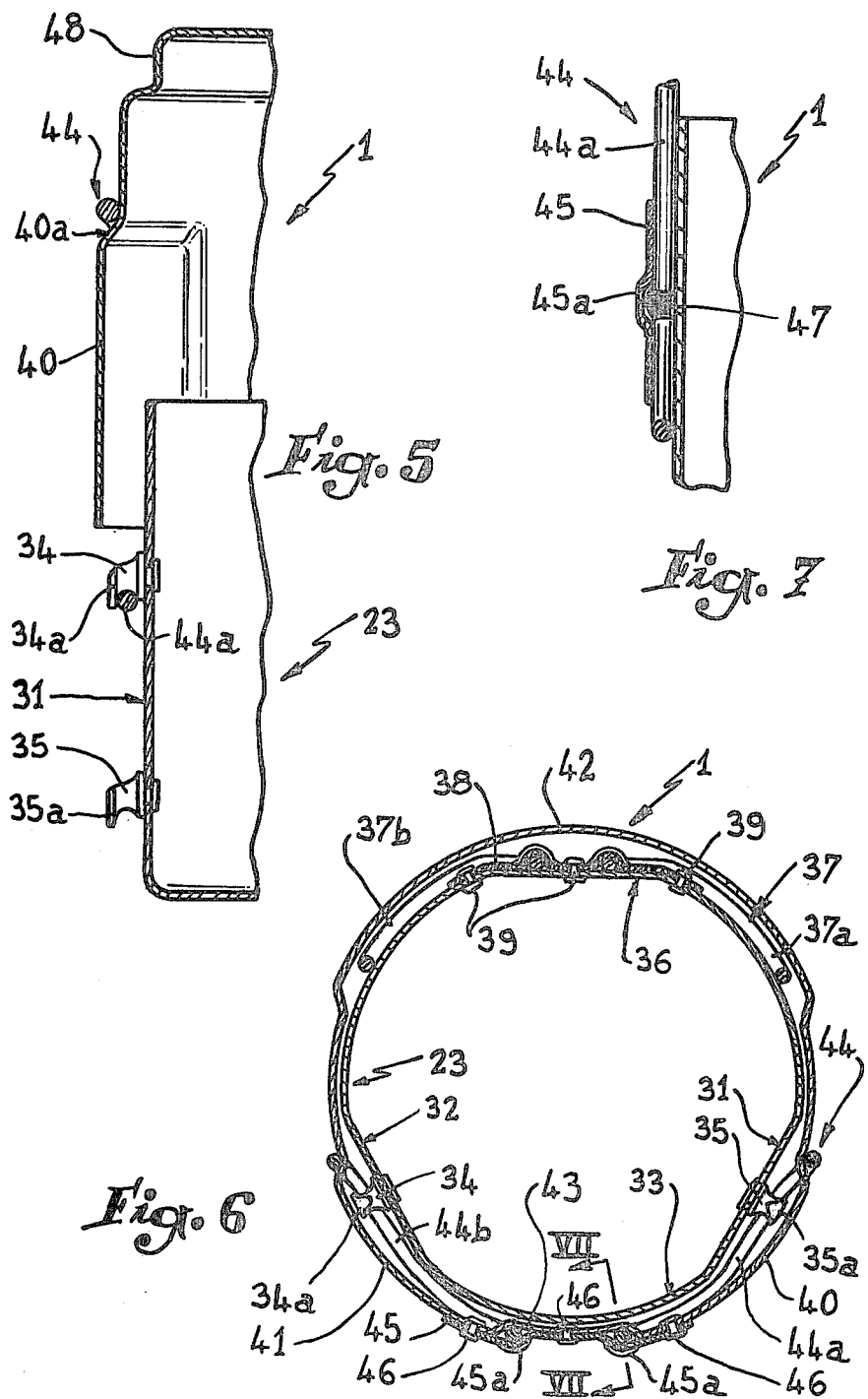

4,185,748

CONTAINER FOR PORTABLE STOVE

FIELD OF INVENTION

This invention relates to a container for storing and carrying a portable stove, and more particularly relates to a container made by using two telescoping saucepans having means for latching the pans together when the stove is stored inside.

BACKGROUND AND PRIOR ART

There is described in a co-pending application of Marcel Vache, Ser. No. 722,901, filed Sept. 13, 1976, and entitled "PORTABLE STOVES", now U.S. Pat. No. 4,105,013, a small portable stove having a stove enclosing cover comprising two saucepans capable of telescopically sliding together, one within the other, the saucepans having first means for uniting them in a manner such that they enclose a first lesser volume corresponding to that of the stove when it is in a partially dismantled configuration, and the saucepans having second means operative for enclosing within the same containers a second larger volume corresponding to that of the stove when it is in fully assembled configuration.

The first means comprises a handle attachable to one of the saucepans which handle is bent at 90° and can be snapped vertically into a guide bracket fixed to one of the saucepans, the bent end of the handle then retaining the other saucepan in such a way that the stove when in its partially dismantled or knocked-down configuration, can be housed in vertical position between the ends of the two telescoped saucepan covers. This lesser-volume configuration corresponds to a storage or transport configuration, before full assembly of the stove and before its attachment to a gas cartridge. Once the stove is assembled to a cartridge it is no longer possible to separate the stove from the pierced cartridge until the latter has been fully emptied, whereby the stove in said larger configuration stands higher than when in said partly dismantled state. According to the above disclosure, the two saucepans can still house the stove in said larger configuration by the use of a strap which passes around them and which constitutes the aforementioned second means.

It can be easily seen that the handle and the strap can become misplaced the moment that they are removed, whereby the means for maintaining the saucepans telescoped within one another can thus be lost making it more difficult not only to use the stove, but especially to transport it. Moreover, these uniting means are not a part of the rest of the apparatus which is especially noted for its great simplicity.

THE INVENTION

The improvements which comprise the object of the present invention seek to remedy the above shortcomings and to provide a stove container of the type set forth in the above mentioned disclosure, but in which the saucepan covers themselves carry means for latching when telescoped one within the other in such a manner that they define between the covers two different volumes corresponding respectively to the two above mentioned configurations of the stove, namely said partially dismantled and said fully assembled configurations.

According to the present invention the aforementioned means for latching the two saucepan covers are intended and arranged to permit them to be telescoped together one within the other without snagging, and to be maintained latched in one or the other of said two different heights to enclose the stove according to one or the other of said two configurations as may be required.

The attached description, given by way of example, provides a better understanding of the present invention, its characteristics, and the advantages which it is capable of providing.

THE DRAWINGS

FIG. 1 is an exploded perspective view of two saucepan covers made according to the present invention;

FIGS. 2 and 3 are perspective views of the two saucepan covers telescoped together respectively to provide the configurations having greater and lesser volumes;

FIG. 5 is a partial cross-sectional view taken along line 5—5 of FIG. 2;

FIG. 6 is a transverse cross-sectional view taken along line 6—6 of FIG. 3; and

Figure 2:
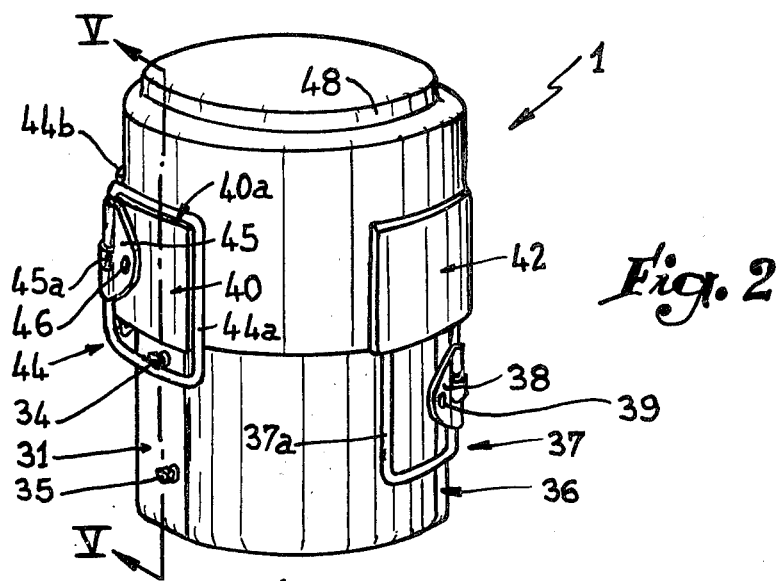

FIG. 7 os an enlarged partial view taken in cross-section along the line 7—7 of FIG. 6.

FIG. 1 shows outer and inner saucepan covers labelled 1 and 23, and corresponding respectively with similar saucepan covers which are similarly labelled in the above mentioned co-pending patent application. The saucepan cover 23 is intended to be a receptacle for receiving the stove whether it is partially dismantled or fully assembled, whereas the saucepan cover 1 is provided to form a cover thereover. The stove can be housed therein in one of two different heights depending on whether it is in the partially dismantled configuration or in the fully assembled configuration, and there is also provided according to the invention latch means mounted on the two saucepan covers for maintaining them closed against the stove in either of the two different configurations and located between the ends of the two covers, the two different telescoped heights being shown in FIGS. 2 and 3.

The inner saucepan cover 23 has a generally cylindrical form, but its peripheral sidewall has two flat areas of extensive height 31 and 32 situated essentially side by side, that is to say, separated by a cylindrical sidewall portion 33 of small extent. On each of the flat areas there is fixed in mutual vertical alignment two headed pins 34 and 35, the vertical distances along each of the flat areas which separate the pins in each pair 34 and 35 correspond substantially to the difference in height in which the two saucepan covers 1 and 23 will be latched, as further discussed hereinafter. Diametrically opposite to the cylindrical portion 33, the saucepan cover 23 is provided with another flat area 36 located at a height on the sidewall to receive pivoted handles 37 of a type known per se and supported by an attaching bracket 38 and pivoted at 39 to the outer surface of the saucepan cover. The handle 37 actually comprises two rings 37a and 37b made by shaping iron wire of circular cross-section. Each one of the rings has a form which is generally square or rectangular. The rings are curved outwardly in such a manner as to follow the exterior contour of the outer surface of the saucepan cover when they are pivoted horizontally about the bracket 38 as can best be explained with reference to FIG. 6.

The outer saucepan cover 1 has a form similar to the cover 23, but its peripheral surface is provided with two bulges 40 and 41 which are enlarged toward the exterior and situated to correspond with the flat areas 31 and 32 of the inner saucepan cover 23. Moreover there has been provided in the peripheral sidewall of the saucepan cover 1 still another bulge 42 diametrically opposite the bulges 40 and 41 which also extends outwardly and whose height extends above the position of the handle 37 when it lies flat against the exterior surface of the saucepan cover 23.

Figure 4:
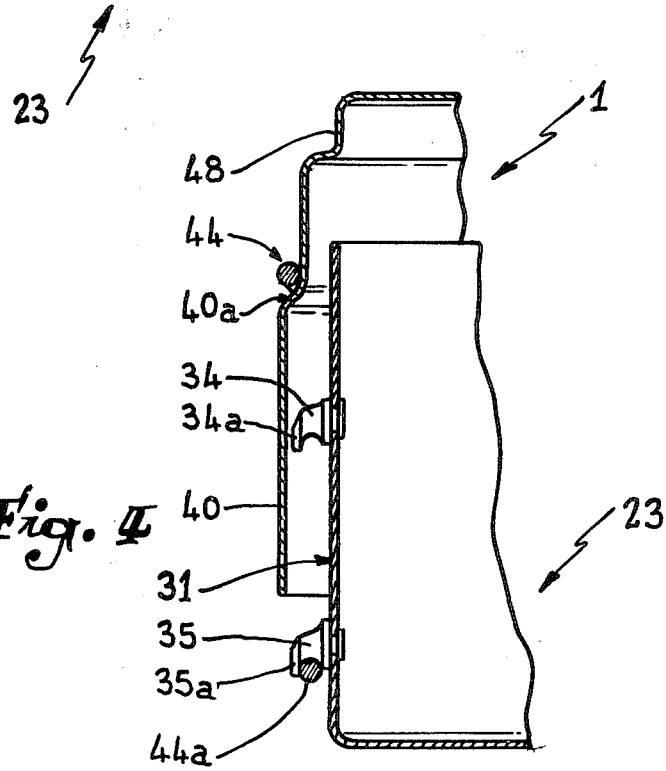
FIG. 4 is a partial cross-sectional view taken along line 4—4 of FIG. 3.

The depths of the bulges 40 and 41 and of the bulge 42 are designed in such a manner that the saucepan cover 1 can slide telescopically on the saucepan cover 23 so that the rings 44a and 44b discussed hereinafter can be latched on the two lowermost pins 35 as shown in FIGS. 2 and 4.

Of course, between the enlargements 40 and 41 there is a cylindrical portion 43 of the peripheral sidewall of the saucepan cover 1 which corresponds to the portion 33 of the cover 23. In the cylindrical portion 43 there is located a handle 44 resembling the handle 37 of the saucepan cover 23. This handle also comprises two rings 44a and 44b comprising female latching elements capable of pivoting horizontally about a vertical axis situated on the side of the saucepan cover 1. More precisely, the rings 44a and 44b are supported in a bracket 45 held on the saucepan cover by rivets 46.

Note that the shape of the rings 44a and 44b is such that each one of them borders along the lateral upper edge of their respective bulges 40 and 41 and each has a lower portion which extends below the bottom opening of the saucepan 1. As to the transverse lower leg portions of the rings 44a and 44b, they are lightly curved toward the interior of the saucepan cover 1 so as to extend toward the male element latch pins 34 and 35. When the stove is in place within the saucepan cover 23 and is coupled with a gas cartridge so that it is in the fully assembled configuration it has a height such that when the ends of the saucepan covers 1 and 23 come into contact with it, it is possible to latch each ring 44a and 44b under the uppermost pins 34 on the corresponding flattened areas as shown in FIG. 2.

On the other hand, if one wishes to transport or store the stove in a partially dismantled configuration when it is not coupled to as gas cartridge, it then occupies a lesser height such that when the ends of the two saucepan covers are in contact therewith, the lower legs of the female ring members 44 will latch under the lowermost male pin members 35 on each of the flat areas as in FIG. 3.

As shown in FIGS. 4 and 5, the upper transverse leg portion of the ring 44a lies against the upper surface 40a of the corresponding bulge 40 in such a manner that it is necessary to apply force against the bottom leg portion of the ring whereby the lower transverse branch will be somewhat deformed downwardly for the purpose of latching it under the head 34a or 35a of whichever of the pins 34 or 35 is being latched. The same is true for the ring 44b which lies against the bulge 41.

FIG. 6 clearly shows the manner in which the saucepan covers 1 and 23 are placed one inside the other in the position necessary to house the stove.

The flat areas 31 and 32 of the saucepan cover 23 show that in spite of the presence of the pins 34 the saucepan 1 can cover the saucepan 23 at that level without hitting them. Likewise, the bulge 42 permits a similar maneuver to cover the two rings 37a and 37b of the handle 37 when flattened against the saucepan. It is further observed that each of the brackets 38 and 45 is fixed in position, the former on the flat area 36 of the saucepan cover 23, and the latter on the two bulges 40 and 41. In order to avoid any vertical displacement of the rings 44a and 44b of the handle 44, the ends of the legs which cooperate with the bracket 45 are joined together by a knob of projecting solder 47, FIG. 7, which is then engaged in a depression 45a in the bracket located opposite the joint and permitting it to pivot.

In this manner there is provided a stove container comprising two saucepan covers which slide together one within the other and receive the stove in one of the above mentioned two configurations, assembled or partly dismantled, and which further includes a simple and economical structure for latching together the two saucepan covers in such a way as to considerably augment the ease and simplicity of using the stove. The sidewall rigidity of the two saucepans is additionally augmented by the presence on them of raised bulges and flat surfaces of such types as to make them more resistant to impact damage. Because of the bulges 40 and 41 which practically fill the interiors of the rings 44a and 44b, the danger of snagging on other objects disposed for example in the same back pack is virtually eliminated.

It is further apparent that it would be sufficient to provide an eyelet at the level of the lower leg of each ring 44a and 44b of the handle 44 to permit latching by said eyelet onto said headed pins 34 or 35 for the purpose of locking together the two saucepan covers at the two different latching levels. It should be noted finally that the end of the saucepan cover 1 is staged in a manner to provide a raised portion 48 whose diameter is such that it will nest into the interior opening of the saucepan cover 23. This makes it possible to use the two saucepans with one carried upon the other, i.e. with the raised portion 48 entering the open end of the saucepan 23.

It should be understood that the preceding description is provided merely by way of example, and that it does not in any way limit the scope of the present invention wherein one can replace details of the embodiment with other equivalents.

We claim:

1. An improved container for enclosing a stove which has multiple different assembled configurations including a fully assembled configuration having a relatively greater height and a partially dismantled configuration having a relatively lesser height, and the container including inner and outer saucepan covers operative to telescope one within the other with closed ends facing each other to provide a container having multiple different heights to receive said stove, and further including latch means for latching together the two saucepan covers in selected ones of said different heights, the improvements comprising:

a series of male latch elements each corresponding with one of said different heights of the container, the male elements being attached to one of said saucepan covers and being vertically aligned one above the other along the sidewall of said one saucepan cover and being vertically spaced by difference between said respective stove heights; and a female latch element attached to the other of said saucepan covers and operative to latch selectively with one of said male elements when the covers are telescoped together to provide a container having one of said multiple heights, the contours of the sidewalls of the saucepan covers in the vicinity of the latch elements being shaped to define an interspace therebetween within which the higher male element when disengaged from said female element can move without snagging, thereby permitting said female element to engage a male element of lesser height when said saucepan covers are telescoped further together.

2. An improved container as claimed in claim 1, wherein said other sacuepan cover carries a handle comprising two rings mounted thereon for horizontal pivoting about a vertical axis on the outer periphery of said other saucepan cover, each ring comprising a female latch element, and said one saucepan cover carrying two series of vertically spaced male latch elements, the male elements in each series being disposed to latch respectively with the two female element rings of the handle.

3. An improved container as claimed in claim 2, including two female elements comprising two rings of the handle, and including in said two series four male elements comprising pins fixed on and extending from said one saucepan cover.

4. An improved container as claimed in claim 3, wherein said other saucepan cover is provided with two radially outwardly extending bulges located respectively to align with and pass over the two series of pins on said one saucepan cover, and wherein said two rings are shaped so that they surround the two aforesaid bulges respectively and extend below the opening of said other cover in such a manner that the two rings lie against the upper surfaces of the two bulges respectively and have a lower portion which snaps onto a pin when resiliently distorted downwardly.

5. An improved container as claimed in claim 3, wherein said one saucepan cover is the inner telescoping cover and said other saucepan cover is the outer telescoping cover.

* * * * *